Nov. 8, 1966 W. OTT 3,283,642
EXPANSIBLE PLUG
Filed May 4, 1964
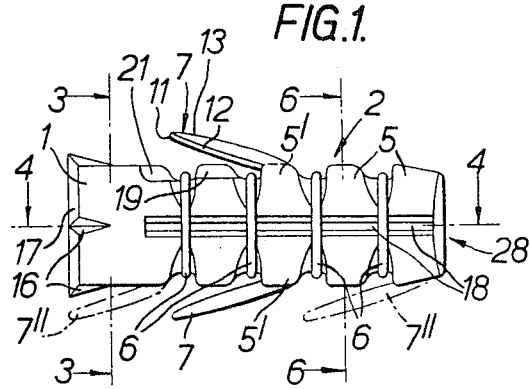
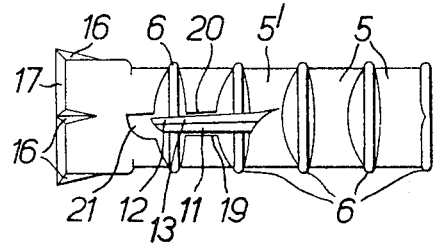
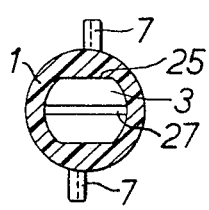
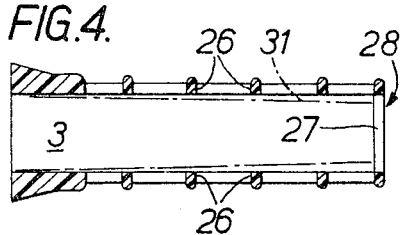
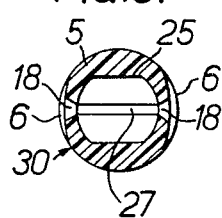
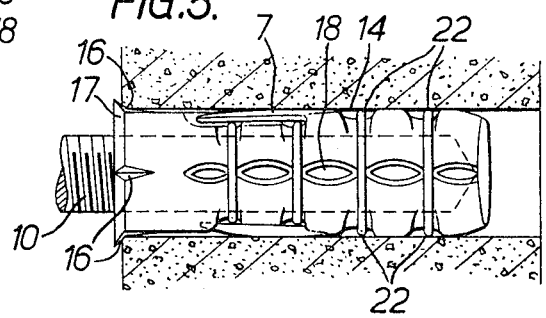
INVENTOR
WALTER OTT
By Graham + Baker
AGENTS

United States Patent Office 3,283,642
Patented Nov. 8, 1966

3,283,642
EXPANSIBLE PLUG
Walter Ott, Toronto, Ontario, Canada
(102 Pintail Crescent, Don Mills, Ontario, Canada)
Filed May 4, 1964, Ser. No. 364,679
5 Claims. (Cl. 85—83)

This invention relates to expansion plugs of the type used with base material such as rock or masonry into which plug a fastening member such as a nail or screw may be driven. The fastening member expands the plug into contact with the walls of a hole in the base material so that it is located securely in position.

While plugs of this general type are well known, it is one object of the present invention to provide a plug preferably formed of a mouldable substance such as a thermo-plastic material, which is easily inserted into a hole in base material, but which grips the walls of the hole securely against rotation when the plug is first inserted. This is particularly important in the early stages of fitting a screw into the plug since it is not then in its expanded condition and may be more easily rotated.

It is also an object of the invention to provide a strong plug, one which is easy to handle and one which is economical in the use of the substance of which it is formed.

More particularly, in accordance with the invention, there is provided an expansion plug comprising, an elongated cylindrical member having a shank and a ribbed portion and being formed of a resilient deformable substance (this may preferably be a tough material such as nylon, or polystyrene, polyethylene, polytetrafluoroethylene, polypropylene, etc.), ribs on said ribbed portion defining part of the outer cylindrical surface of said portion and reliefs between said ribs, said plug defining a bore therein and slots in said ribbed portion extending longitudinally along part of the length of said ribbed portion and passing from the outer surface of said portion into said bore, leaf spring members formed on said plug and projecting beyond said outer surface of said plug, said spring members comprising a flange portion extending in a direction radially and outwardly of said plug, said flange providing engaging means on said plug for material engagement before said plug is expanded by member insertion into said bore.

The flange is preferably tapered in a radially outward direction for forming a sharp incising part. Reinforcing bands may be formed on said ribbed portion passing through said reliefs and defining the surface of said portion in regions circumferentially remote from said ribs. The slots extend between said adjacent bands. A slit may also be provided in the end of said plug on the ribbed portion. The slots may be tapered inwardly from the surface of the plug and the bore may be tapered in the direction of shank to ribbed portion. Preferably, the bore is flattened in regions beneath the ribs so that a greater thickness of material is placed between the ribs and the bore. Ridges may be provided on the shank for engaging the walls of a hole into which the plug is placed. A raised lip may also be provided on the outer end of the plug on the shank so that the plug is prevented from being inserted too far into the hole with which it is to cooperate.

In the explanation which follows, reference will be made to the accompanying drawings in which:

FIGURE 1 shows a side view of a plug constructed in accordance with the teaching of the invention;

FIGURE 2 shows a plan view of that of FIGURE 1;

FIGURE 3 shows an end view of the plug of FIGURES 1 and 2, sectioned along line 3—3 of FIGURE 1 looking in the direction of insertion of the fastening means which will expand the plug;

FIGURE 4 shows a side view similar to that of FIGURE 2, but sectioned along line 4—4 of FIGURE 1 to show the internal structure of the plug;

FIGURE 5 shows a view of the plug in a hole and expanded into contact with the walls of the hole; and FIGURE 6 is a section along line 6—6 of FIGURE 1.

As seen in FIGURE 1, a plug constructed in accordance with the teaching of the invention comprises, a shank 1 and a ribbed portion 2. The plug is hollow as shown in FIGURES 3 and 4 and includes a bore 3. This bore may, however, be tapered if desired in the direction of shank to ribbed portion, as shown in broken lines 3' (FIGURE 4). The portion 2 carries work engaging ribs 5 on its upper and lower parts as seen in FIGURE 1, and may also include integrally formed reinforcing bands 6. Two of the ribs 5' have cantilever suspended spring leaves 7 which project outwards beyond the surface of the plug defined by the outer surfaces of the ribs 5 and bands 6. These leaves engage the walls of the hole into which the plug is placed initially and being biased outwards help to prevent rotation of the plug when the fastening member 10 (see FIGURE 5) is inserted into it. Each leaf 7 is of angle section comprising, a plate portion 11 and an upstanding flange portion 12 which projects from the plate portion 11 in a direction radially of the plug.

The upstanding flange 12, besides giving strength to the leaf 7 by increasing the moment of inertia of cross section may also be tapered in a radial direction so that its outermost surface provides a sharp incising edge 13 for engaging the hole wall 14. The plate 11 extends in the direction in which member 10 is intended to be rotated and thus if the plug tends to turn at the same time material from the walls of the hole tends to pack into the crook between flange 12 and plate 11 and increase the binding effect between the walls and plug. The shank 1 is provided with ridges 16 which also assist in biting into the walls of a hole as shown in FIGURE 5 to prevent rotation of the plug. At the outer end of the plug on the shank 1 is a raised lip 17 which engages the hole walls and prevents the plug from being pushed too far into the hole. Between each pair of bands 6, the side of the ribbed portion 2 of the plug is penetrated by a slot 18. These slots form a bow-tie or inwardly tapered trapezoidal section as shown in FIGURE 6 and allow the use of less material then if parallel sided.

The plug substance is preferably of a nylon type since this is extremely tough and resists softening up to fairly high temperatures, does not crack when bent or cut into and is thermoplastic to allow for ease in fabrication by injection moulding techniques. Polystyrene, polyethylene, polytetrafluorethylene and polypropylene are also satisfactory materials.

When the plug is inserted into a hole, the leaves 7 are bent down practically flush with the outer surface of the plug. The ribs 6" adjacent and beneath the leaves are relieved at 19 to allow this. It may also be necessary in some instances, if the leaves 7 are of considerable length, to undercut the surface of shank 1 as shown at 21.

When the leaves 7 are preventing the turning of the plug, as described above, the shoulder 20, formed by relief 19, reinforces the leaves against bending and being carried round the plug.

When the member 10, such as a lag bolt, is inserted into the plug, the sections carrying the ribs 5 are caused to move outwards, bringing the ribs into firm contact with the walls 14 of the hole. The bands 6 also expand to some extent and contact the hole walls as shown at 22.

Referring to FIGURES 3 and 5, the bore 3 is flattened in the portions 25 beneath the ribs 5. This enables a greater thickness of material to be placed between the ribs and the fastening member 10. It is in this section that the greatest binding effect between the hole walls 14 and the fastening member 10 is felt. When the member 10 is screwed into the plug, some radial expansion of the plug takes place in the plane of the paper for FIGURE 4. The bands 6 thus enter into firm contact with the hole wall 14 in this area.

As FIGURE 6 shows, in the ribbed portion the outer surface which the plug presents in section is defined partly by the ribs 5 and in the regions 30, circumferentially remote from the ribs, by the outer surfaces of the bands 6. On the shank 1, the plug surface is defined by its surface.

As seen in FIGURE 5, the effect of the expanding of the plug by member 10 is to open up the slots 18 but the bands 5 and their integrally attached sections 26 help to maintain the plug as a unitary piece. This is desirable should the plug need to be removed at any time since it will tend to regain its original shape and can be used again. A slit 27 in the end of the plug allows the inner end 28 to open out when member 10 is inserted. This opening out would otherwise be prevented by the excessive reinforcement at this end in instances when bore 3 did not extend right through the plug. In manufacture, the task of making a completely penetrating bore is often difficult on a mass production scale using injection moulding techniques.

Whilst the spring leaves 7 have been shown fastened to the ribbed portion 2 at points remote from the slots 18, they may be placed elsewhere on the plug, for instance closer to or upon the shank 1, or the inner end 26 of the plug, for instance as shown in broken lines at 7′ and 7″ on FIGURE 1.

I claim:
1. An expansion plug for a screw threaded member comprising, an elongated cylindrical member having a shank and a ribbed portion and being formed of a resilient deformable substance, ribs on said ribbed portion defining part of the outer surface of said plug, and reliefs between said ribs, reinforcing bands integrally formed on said ribbed portion passing through said reliefs and defining the outer surface of said portion in regions circumferentially remote from said ribs, said plug defining a bore therein, and slots in said ribbed portion each extending longitudinally along part of the length of said ribbed portion and passing from the outer surface of said portion into said bore, said slots extending longitudinally between adjacent bands, leaf spring members formed on said plug and projecting beyond said outer surface of said plug, said spring members being of angle cross section and comprising, a flange portion extending in a direction radially and outwardly of said plug, and a plate portion extending transversely to said flange portion in the direction of rotation of said screw threaded member, said flange providing engaging means on said plug for engagement of material defining a hole for receiving said plug before said plug is expanded by member insertion into said bore, said flange being tapered in a radially outward direction for forming a sharp incising part, said entire angle cross section intersecting said surface of said plug and each said spring member being stiffened by virtue of said angle cross section for applying rigid holding pressure against said material by said flange when deflected by said material.

2. A plug as defined in claim 1, said slots being tapered inwardly from the surface of said plug.

3. A plug as defined in claim 1 comprising, ridges on said shank portion tapering in a direction radially outwards of the plug and in the longitudinal direction of the plug from shank to ribbed portion, said ridges providing engaging means for material engagement extending beyond said surface of said plug.

4. A plug as defined in claim 1 wherein said plug substance is selected from the group consisting of nylon, polystyrene, polyethylene, polytetrafluorethylene, and polypropylene.

5. A plug as defined in claim 1 comprising, a raised lip on said shank adjacent the end of said plug.

References Cited by the Examiner

UNITED STATES PATENTS

| | | | |
|---|---|---|---|
| 1,161,617 | 11/1915 | Clements | 85—76 |
| 2,240,716 | 5/1941 | Pleister et al. | 85—88 |
| 3,171,321 | 3/1965 | Fisher | 85—83 |
| 3,199,398 | 8/1965 | Weisz | 85—83 |

FOREIGN PATENTS

| | | |
|---|---|---|
| 705,398 | 4/1941 | Germany. |
| 455,280 | 10/1936 | Great Britain. |
| 379,735 | 2/1962 | Switzerland. |

CARL W. TOMLIN, *Primary Examiner.*

EDWARD C. ALLEN, *Examiner.*

M. PARSONS, JR., *Assistant Examiner.*